United States Patent
Svetlana et al.

(10) Patent No.: US 8,945,715 B2
(45) Date of Patent: Feb. 3, 2015

(54) LOW $V_2O_5$—CONTENT AND $V_2O_5$—FREE PORCELAIN ENAMELS

(75) Inventors: Efimenko Svetlana, Torhout (BE); Nancy Crevits, Dudzele (BE); Christian Schlegel, Croix (FR)

(73) Assignee: Pemco Brugge BVBA, Brugge (BE)

( * ) Notice: Subject to any disclaimer, the term of this patent is extended or adjusted under 35 U.S.C. 154(b) by 331 days.

(21) Appl. No.: 12/993,113

(22) PCT Filed: Aug. 12, 2009

(86) PCT No.: PCT/EP2009/060439
§ 371 (c)(1),
(2), (4) Date: Nov. 17, 2010

(87) PCT Pub. No.: WO2010/020570
PCT Pub. Date: Feb. 25, 2010

(65) Prior Publication Data
US 2011/0129679 A1    Jun. 2, 2011

(30) Foreign Application Priority Data
Aug. 22, 2008   (EP) .................................... 08162814

(51) Int. Cl.
| | |
|---|---|
| C03C 8/08 | (2006.01) |
| C03C 8/14 | (2006.01) |
| B32B 15/04 | (2006.01) |
| C03C 8/12 | (2006.01) |
| C03C 3/064 | (2006.01) |
| C23D 5/02 | (2006.01) |

(52) U.S. Cl.
CPC . C03C 8/12 (2013.01); C03C 3/064 (2013.01); C03C 8/14 (2013.01); C03C 2207/04 (2013.01); C03C 2207/08 (2013.01); C03C 2207/10 (2013.01); C23D 5/02 (2013.01)
USPC ............. 428/433; 428/469; 501/21; 501/24; 501/68; 501/73; 501/20; 501/77

(58) Field of Classification Search
None
See application file for complete search history.

(56) References Cited

U.S. PATENT DOCUMENTS

| | | | |
|---|---|---|---|
| 2,909,438 A * | 10/1959 | Kautz ........................... | 428/631 |
| 3,927,243 A * | 12/1975 | Theisen ........................ | 428/433 |
| 5,650,364 A | 7/1997 | Muenstedt et al. | |
| 6,429,161 B1 * | 8/2002 | Souchard et al. ............... | 501/17 |
| 6,638,600 B2 * | 10/2003 | Gazo et al. .................... | 428/141 |
| 2004/0077477 A1 * | 4/2004 | Gazo .............................. | 501/19 |

FOREIGN PATENT DOCUMENTS

| | | |
|---|---|---|
| DE | 2422291 A1 | 12/1974 |
| DE | 3516009 A1 | 12/1985 |
| EP | 0522401 A1 | 6/1992 |
| FR | 1251468 A | 1/1961 |
| GB | 1485142 A * | 9/1977 |
| SU | 1803394 A1 | 3/1993 |
| WO | 2006/083160 A1 | 8/2006 |

OTHER PUBLICATIONS

Rodtsevich, S.P., Eliseev, S. Yu, and Tavgen, V.V; Low-Melting Chemically Resistant Enamel for Steel Sitchenware, Glass and Ceramics, vol. 60, Nos. 1-2, 2003; Translated from Steklo i Keramika, No. 1, pp. 25-27, Jan. 2003.

* cited by examiner

*Primary Examiner* — David Sample
(74) *Attorney, Agent, or Firm* — Clements Bernard PLLC; Gregory N. Clements

(57) ABSTRACT

The present invention relates to a low-$V_2O_5$-content and even $V_2O_5$-free porcelain enamel with improved dish-washer resistance, very good acid resistance and good adherence on various substrates. The invention moreover relates to a transparent low-$V_2O_5$-content and even $V_2O_5$-free porcelain enamel frit for application of enamel coatings with infinite color range on a substrate made of aluminum, cast aluminum, aluminum alloy, aluminum-magnesium alloy, cast aluminum alloy, copper, austenitic stainless steel and mild steel, presenting improved dish-washer resistance, good acid resistance and good adherence on the substrate.

The composition of the porcelain enamel in question comprises about 30 wt-% to about 50 wt-% $SiO_2$, about 30 wt-% to about 40 wt-% $R_2O$, about 15 wt-% to about 25 wt-% $TiO_2$, about 0 wt-% to about 5 wt-% RO, about 0 wt-% to about 4 wt-% $V_2O_5$, about 0.3 wt-% to about 7 wt-% $Fe_2O_3$, about 0 wt-% to about 3 wt-% $Sb_2O_3$, about 0 wt-% to about 3 wt-% $SnO_2$, about 0 wt-% to about 2 wt-% $B_2O_3$, about 0 wt-% to about 3 wt-% $Al_2O_3$, about 0 wt-% to about 4 wt-% $P_2O_5$, about 0 wt-% to about 1 wt-% $MoO_3$, about 0 wt-% to about 2 wt-% $F_2$, about 0 wt-% to about 4 wt-% $ZrO_2$, about 0 wt-% to about 4 wt-% ZnO, about 0 wt-% to about 6 wt-% $NO_x$, $R_2O$ is a combination of alkaline oxides selected from the group of: $Na_2O$ 10-23 mol %, $K_2O$ 7-20 mol % and $Li_2O$ 1-6.5 mol %, wherein RO represent at least one earth alkali oxide and wherein the molar ratio of ($Li_2O+B_2O_3$) to $TiO_2$ amounts to 0.2 to 0.6.

6 Claims, No Drawings

LOW $V_2O_5$—CONTENT AND $V_2O_5$—FREE PORCELAIN ENAMELS

The present invention relates to a low-$V_2O_5$-content and even $V_2O_5$-free porcelain enamel with improved dish-washer resistance, very good acid resistance, and good adherence on various substrates. The invention moreover relates to a transparent low-$V_2O_5$-content and even $V_2O_5$-free porcelain enamel frit for application of enamel coatings with infinite colour range on a substrate made of aluminium, cast aluminum, aluminium alloy, aluminium-magnesium alloy, cast aluminium alloy, copper, austenitic stainless steel and mild steel, presenting improved dish-washer resistance, very good acid resistance and good adherence on the substrate.

WO 2006/083160 A1 relates to an enamel composition for application as dielectric. The invention also relates to the use of such an enamel composition for application as dielectric. The invention further relates to a dielectric layer with such an enamel composition. The invention also relates to an assembly of such a dielectric layer and a support structure manufactured at least partially from stainless steel, wherein the dielectric player is arranged on a part of the support structure manufactured from stainless steel. The invention moreover relates to a method for manufacturing such an assembly. The enamel composition as presented in WO 2006/083160 can be not used on aluminium, cast aluminium, aluminium alloys, aluminium-magnesium alloys and copper because firing temperature of the enamel composition is much more higher than the melting point of the substrate (600 to 660° C.). Furthermore, the enamel composition as presented in WO 2006/083160 can be not used on aluminium, cast aluminium, aluminium alloys, aluminium-magnesium alloys, copper and also austenitic steel because of to low TEC of the presented enamel composition and therefore is a cause of bad adherence.

DE 3516009 A1 relates to the composition of an enamel frit, which can be used to enamel metallic substrates. The composition described herein can be not used on aluminium, cast aluminium, aluminium alloys, aluminium-magnesium alloys and copper because the firing temperature of the enamel composition is much more higher than the melting point of the substrate (1100 to 1200° C.).

FR-A-1251468 relates to the composition of enamel frits and in more detail to enamel frits to cover light metals such as aluminium and its alloys, where said enamel frits are completely free of toxic metal oxides, such as PbO, CdO, and BaO. The composition described herein does not contain any $Fe_2O_3$.

SU 1803394 A1 relates to an enamel composition for application on aluminium or aluminium-alloy. The here described composition of the enamel frit does not contain any $K_2O$.

U.S. Pat. No. 5,650,364 relates to self-opacifying enamel frits compositions that can be used for the enameling of aluminium and aluminium alloys. The composition described herein contains 6 to 11 wt-% $V_2O_5$. The self-opacifying of the said frit composition prevents from colouring the enamel with inorganic pigments.

DE 2422291 A1 relates to a technique to produce non-toxic enamels, based on $SiO_2$, alkaline metal oxide and titanium oxide, which are appropriate for enameling aluminium. It relates to enamel composition including amounts of CoO, NiO, and MnO, resulting in a coloured enamel.

EP-A-0522401 relates to a technique to a) enamel aluminium-cast steel by applying an enamel composition, consisting of (I) at least one low-melting enamel frit, passing into a glassy state below 600° C., (II) at least one inorganic oxide powder with a melting temperature higher than 900° C., which is at least partly soluble in the low-melting enamel from (I) by elevating the viscosity, and (III) at least one of the oxides of iron or copper, b) drying the enamel and c) baking at 800 to 850° C. The composition described herein is not applicable on cast aluminium, aluminium alloys, aluminium-magnesium alloys and copper as the temperature required is too high.

S. P. Rodtsevich, S. Yu. Eliseev and V. V. Tavgen (Glass and Ceramics, Vol. 60, Nos. 1-2, 2003) relates to technological conditions for obtaining titanium-borosilicate glasses and properties of enamel coating, spreadability of enamels, and luster of coatings. In this publication the effect of boron and alkali metal oxide on the physicochemical properties of titanium-borosilicate enamels is studied. It relates to the decrease of the chemical resistance of glass and corrosion resistance of coating and an increased leachability of boron from enameled coatings caused by an increased amount of boron oxide in glass (at the expense of $SiO_2$ and or $TiO_2$, $R_2O$). A decrease of the firing temperature as well as of the chemical resistance of the enamel by an increase of metal oxide addition is described herein. The publication relates to a joint introduction of alkaline metal oxides and boron oxide, for instance, at the expense of $SiO_2$, in a specific ratio, then even substantial quantities of both components do not have an adverse effect on the chemical resistance of coatings. It describes that that glasses with the ratio $B_2O_3$:$R_2O$ (where $R_2O$ is used for $Li_2O$, $Na_2O$, $K_2O$) close to 1 have the highest resistance in acetic acid solution, and that alkali oxides should be introduced not as a single oxide but as a combination of oxides. The publication relates to an investigation of titanium-boronsilicate enamel which established that enamels with the alkali oxide ratio $Na_2O$: $K_2O$ $Li_2O$ equal to 3:2:1 exhibit the highest chemical resistance, while the presence of $Li_2O$ has an especially favourable effect on the chemical resistance of the enamel. The publication relates only to ratios $B_2O_3$:$R_2O$ between 0.6 to 1.8, while ratios between the single alkaline oxides to boron oxide are not regarded at all. Furthermore, the amount of $TiO_2$ in the frit composition is not considered at all.

Thus, the problem of the invention with respect to this prior art is to be seen in the provision of an enamel composition being able to be fired on low temperature sensitive metals, for example at a temperature in the range of 520 to 580° C., by showing good chemical stability. Furthermore, said enamel composition should have a good dish-washer resistance. In addition, the enamel should be transparent, to be able to add inorganic pigments for colouring, if required.

Said problem is solved in a first embodiment by transparent porcelain enamel compositions for enameling a substrate selected from the group of aluminium, cast aluminium, aluminium alloy, aluminium-magnesium alloy, copper, austenitic stainless steel and mild steel, said composition including a glass frit, said glass frit each comprising by weight:

about 30 wt-% to about 50 wt-% $SiO_2$,
about 30 wt-% to about 40 wt-% $R_2O$,
about 15 wt-% to about 25 wt-% $TiO_2$,
about 0 wt-% to about 5 wt-% RO,
about 0 wt-% to about 4 wt-% $V_2O_5$,
about 0 wt-% to about 5 wt-% $Fe_2O_3$,
about 0 wt-% to about 5 wt-% $Sb_2O_3$,
about 0 wt-% to about 3 wt-% $SnO_2$
about 0 wt-% to about 2 wt-% $B_2O_3$,
about 0 wt-% to about 3 wt-% $Al_2O_3$,
about 0 wt-% to about 4 wt-% $P_2O_5$,
about 0 wt-% to about 1 wt-% $MoO_3$,
about 0 wt-% to about 2 wt-% $F_2$,
about 0 wt-% to about 4 wt-% $ZrO_2$,
about 0 wt-% to about 4 wt-% ZnO and
about 0 wt-% to about 6 wt-% $N_2O_5$ wherein $R_2O$ is a combination of alkaline oxides selected from the group of $Na_2O$, $K_2O$, and $Li_2O$ in molar fractions of:

$Na_2O$ 10-23 mol %
$K_2O$ 7-20 mol %
$Li_2O$ 1-6.5 mol %, the molar ratio of $(Li_2O+B_2O_3)$ to $TiO_2$ amounts to 0.2 to 0.6, and RO is an earth alkaline oxide selected from the group of MgO, CaO, SrO, BaO and combinations thereof.

Essential for the chemical stability of the resulting enamel according to the present invention is the molar amount of alkali metal oxides in the frit composition, which should be in the range of 7 mol % to 20 mol % for $K_2O$, in the range of 1 mol % to 6.5 mol % for $Li_2O$, and in the range of 10 mol % to 23 mol % for $Na_2O$, as well as the molar ratio between $(Li_2O+B_2O_3)$ to $TiO_2$, which should be in the range of 0.2 to 0.6. Higher molar ratios between $(Li_2O+B_2O_3)$ to $TiO_2$ result in a worse chemical stability, in means of classification in acid resistance and spalling test.

The compositions of the present invention do not contain metal oxides from the group of CuO, CoO, NiO or MnO, resulting in a transparent enamel, which then allows intensive colouring by adding pigments, if needed.

In general, the present invention requires the following pre-treatment of a substrate made for example of aluminium, sheet aluminium alloy, and sheet aluminium-magnesium alloy:

Free silicates and inhibitors alkaline degreasing (temperature 60-70° C./5-10 min)
Warm rinsing with overflow (temperature 60° C.)
Alkaline pickling (temperature 60° C., losses in weight 6-10 g/m²)
Warm rinsing with overflow (temperature 60° C.)
Cold rinsing with overflow
Neutralisation 1.5 l $HNO_3$/10 l (temperature 20° C.)
Cold rinsing with overflow
Cold rinsing with deionised water
Drying at 80° C.

In the case of cast aluminium alloy the following treatment is preferred according to the present invention:

Thermal degreasing 520° C./10 min
Sand-blasting.

In case of austenitic stainless steel the following treatment is preferred according to the present invention:

Chemical degreasing
Sand-blasting.

The beneficial properties of the porcelain enamel according to the present invention are determined by several test methods as referred hereinafter:

Adherence "Spalling" Test:

This test is determined by antimony trichloride test to ISO 51173. To this end, the enameled sample is dipped in an appropriately saturated solution for 24 h, after scratching a cross shape in the enamel coating. If no significant changes in the scratch are detected after this period, the test is considered successful.

Calgonit Dishwasher® Test:

Similarly enameled specimens (1 of them being the standard) are simultaneously exposed to attack by a commercially available dishwasher detergent "Calgonit® compact" powder 30 g/l under 60° C. during 6 h, the solution being continuously stirred during the test. The loss in mass is determined and used to calculate the rate of loss in mass per unit area. The loss in mass per unit area of tested specimens was compare with the loss in mass per unit area of the standard sample. The standard sample was the $V_2O_5$-enamel with the best dish-washer resistance.

Acid Resistance Test:

According to EN 14483-1, §9, the enameled specimens are exposed to a 9 wt-% citric acid solution at 22° C. for 15 minutes. If no optical changes are found, the enamels are classified with "AA". If optical changes are visible, the enameled specimens are tested with a dry pencil. Enamelled specimens, passing this test, are classified with "A+". Enamelled specimens, not passing the dry pencil test, are tested by a wet pencil. Enamelled specimens, passing this test, are classified with "A", while enameled specimens not passing the wet pencil test, are described as "not classified".

In case that the compositions according to the present invention should result in a wide range of specific colour or specific performance, the use of well-known inorganic pigments (as mill addition) and/or effect pigments (added before and/or after milling process) may be taken into account, provided that the frit composition itself results in a transparent enamel. Effect pigments contain thin platelets of natural mineral mica or are based on a synthetic substrate, namely, aluminium oxide flakes or silicon dioxide flakes or calcium-aluminum-borosilicate particles, which are covered with a thin layer of metal oxides such as titanium dioxide, iron oxide and/or tin oxide. These effect pigments are commercially available.

As is well-known in the prior art, the manufacture of porcelain enamels usually requires the use of mill additions. Accordingly, the use of mill additions selected from the group of boric acid, formic acid, molybdic acid, sodium molybdate, ammonium molybdate, potassium silicate, sodium silicate, lithium silicate, hydroxides, fluorides, carbonates, nitrate, nitrite, aerosols, urea, and combination thereof is preferred.

The porcelain enamel composition according to the present invention may be applied on a substrate by various processes. The so-called "one coat/one fire" process is in particular preferred to apply the compositions on a substrate. Said process is in particular characterized by the following steps of a) applying said enamel composition on said substrate by wet spraying,
b) firing the enamel at a temperature in the range of 535 to 580° C.

The present invention may also be applied using the so-called "two coat/one fire" application procedure. This process is in particular characterized by the following steps of a) applying the $1^{st}$ enamel composition, presenting good adherence properties, as defined above on a substrate by wet spraying,
b) applying the $2^{nd}$ enamel composition as defined above on said pre-coated substrate by wet spraying, having dish-washer and acid resistance,
c) firing said enamel compositions at the temperature in the range of 535 to 580° C.

As is well-known in the art, the production of an enamel frit composition requires the milling whereby a general wet-milling or dry-milling is quite known.

Thus, in a further embodiment of the present invention, said enamel composition is wet-milled with said mill addition(s) or said pigment(s).

Alternatively to the above described process, said enamel composition(s) is (are) dry-milled and dissolved in water with said mill addition(s) and/or said pigment(s).

According to the present invention, the compositions and processes are used for enameling of the substrate selected from the group consisting of aluminium (TEC: $240 \times 10^{-7}$/K), aluminium alloy (TEC: $240\text{-}260 \times 10^{-7}$/K), aluminium-magnesium alloy (TEC: 240-260×10$^{-7}$/K), cast aluminium alloy (TEC: 240-260×10$^{-7}$/K), copper (TEC: 180×10$^{-7}$/K) and austenitic stainless steel (TEC: 240×10$^{-7}$/K) presenting improved dish-washer resistance, very good acid resistance, and good adherence on the substrate.

EXAMPLES

The invention is illustrated on the basis of the following non-limiting examples. Amounts of the oxides given in the examples relate to parts by weight unless otherwise indicated.

Example 1

A first glass frit A was smelted according to conventional means (1150° C./20 min) whereby a glass frit resulted after melting with the composition and TEC shown in table 1.

TABLE 1

| $Al_2O_3$ | $B_2O_3$ | CaO | $Fe_2O_3$ | $K_2O$ | $Li_2O$ | $MoO_3$ | $Na_2O$ | $P_2O_5$ | $SiO_2$ | $TiO_2$ | TEC 400 |
|---|---|---|---|---|---|---|---|---|---|---|---|
| 0.5 | 2 | 2.5 | 4.3 | 11.8 | 2.3 | 0.3 | 19.1 | 2 | 39.1 | 16.1 | 162 * 10$^{-7}$ |

The frit together with milled additives was wet milled to a fineness of 0.1/16900# (BAYER®-Enamel-Test sieve) in order to obtain an enamel slurry. The composition of the slurry is shown in table 2.

TABLE 2

| Component | Parts by weight |
|---|---|
| Frit | 100 |
| Boric acid | 4 |
| Potassium hydroxide | 1.5 |
| Sodium silicate | 1 |
| Black pigment | 4 |
| Deionised water | 55-60 |

After grinding and sieving the enamel was sprayed on to substrate and fired at the temperature of 560° C. The layer thickness amounted about 65-80 μm.
The enamel was tested according to:
Spalling test
The results may be found in table 3.

TABLE 3

| | Substrate | | | | | | | |
|---|---|---|---|---|---|---|---|---|
| | Aluminium alloys, aluminium-magnesium alloys | | | | | Stainless steel | | Cast |
| | 4917 | 4006 | 3003 | 3105 | 3004 | 304 | 316L | Alu |
| Spalling test | Ok | Ok | Ok | Ok | Ok | Ok | Ok | Ok |

Dish-washer resistance, "Pemco" home test—Calgonit® compact 6 h/60° C.-30 g Calgonit®/l:
 weight loss −2.2 g/m$^2$
 Acid resistance, EN14483-1, §9: class A Example 2

Said glass frit A was smelted according to example 1 under the same conditions.
The frit together with milling additives was wet milled to a fineness of 0.1/16900# (BAYER®-Enamel-Test sieve) in order to obtain enamel slurry. The composition of the slurry is shown in table 4.

TABLE 4

| Component | Parts by weight |
|---|---|
| Frit | 100 |
| Boric acid | 4 |
| Potassium hydroxide | 1.5 |
| Sodium silicate | 1 |
| Deionised water | 55 |

After grinding and sieving the enamel was sprayed on to substrate and fired at the temperature of 560° C. The layer thickness amounted about 65-80 μm.

The enamel was tested according to:
Spalling test
The results may be founding table 5.

TABLE 5

| | Aluminium alloys | | |
|---|---|---|---|
| Alloy N | 4917 | 4006 | 3003 |
| Spalling test | Ok | Ok | Ok |

Dish-washer resistance, "Pemco" home test—Calgonit® compact 6 h/60° C.-30 g Calgonit®/l:
 weight loss −2.4 g/m$^2$
 Acid resistance, EN14483-1, §9: class A+

Example 3

Said glass frit A was smelted according to Example 1 under the same conditions.
The frit was dry milled in a ball mill to a finesse D (50) ~6 μm. After sieving (sieve: 80 μm) 100 g powder was dissolved, using high speed mixer in 4% boric acid solution with the milling additions to enamel slurry. The composition of the slurry is shown in table 6.

TABLE 6

| Component | Parts by weight |
|---|---|
| 4% Boric acid solution | 55-60 |
| Potassium hydroxide | 0.5 |
| Sodium silicate | 1 |
| Black pigment | 10 |

The enamel was sprayed onto substrate and fired at the temperature of 560° C. The layer thickness amounted about 65-80 μm.

Enamel was tested according to:
Spalling test
The results may be found in table 7.

TABLE 7

| | Substrate | | | | | |
|---|---|---|---|---|---|---|
| | Aluminium alloys | | | Stainless steel | | Cast Alu |
| | 4917 | 4006 | 3003 | 304 | 316L | |
| Spalling test | Ok | Ok | Ok | Ok | Ok | Ok |

Dish-washer resistance, "Pemco" home test—Calgonit® compact 6 h/60° C.-30 g Calgonit®/l:
weight loss −0.3 g/m$^2$
Acid resistance, EN14483-1, §9: class A+

Example 4

A second glass frit B was smelted according to conventional means (1150° C./30 min) whereby a glass frit resulted after melting with the composition and TEC shown in table 8.

TABLE 8

| $Al_2O_3$ | $B_2O_3$ | BaO | $Fe_2O_3$ | $K_2O$ | $Li_2O$ | $Na_2O$ | $P_2O_5$ | $SiO_2$ | $TiO_2$ | $V_2O_5$ | TEC 400 |
|---|---|---|---|---|---|---|---|---|---|---|---|
| 0.1 | 0.6 | 0.3 | 3 | 11.8 | 2.3 | 19.2 | 1.6 | 35.2 | 23.7 | 2.2 | 166 * 10$^{-7}$ |

The frit together with milling additives was wet milled to a fineness of 0.1/16900# (BAYER®-Enamel-Test sieve) in order to obtain enamel slurry. The composition of the slurry is shown in table 9.

TABLE 9

| Component | Parts by weight |
|---|---|
| Frit | 100 |
| Boric acid | 4 |
| Potassium hydroxide | 1.5 |
| Sodium silicate | 1 |
| Deionised water | 50 |

After grinding and sieving the enamel was sprayed on to substrate and fired at the temperature of 560° C. The layer thickness amounted about 65-80 μm.
Enamel was tested according to:
Spalling test—very good
The results may be found in Table 10.

TABLE 10

| | Aluminium alloys | | | Stainless steel | |
|---|---|---|---|---|---|
| Substrate | 4917 | 4006 | 3003 | 304 | 316L |
| Spalling test | Ok | Ok | Ok | Ok | Ok |

Dish-washer resistance, "Pemco" home test—Calgonit® compact 6 h/60° C.-30 g Calgonit®/l:
weight loss −0.8 g/m$^2$ Acid resistance, EN14483-1, §9: class AA Example 5

Said glass frit A (s. Tab. 1) was smelted according to example
Frit A together with milling additives was wet milled to a fineness of 0.1/16900# (BAYER®-Enamel-Test sieve) in order to obtain enamel slurry "a". The composition of the slurry is shown in table 11.

TABLE 11

| Component | "a", parts by weight |
|---|---|
| Frit | 100 |
| Boric acid | 4 |
| Potassium hydroxide | 1.0 |
| Sodium silicate | 1 |

TABLE 11-continued

| Component | "a", parts by weight |
|---|---|
| Black pigment | 10 |
| Deionised water | 55-60 |

In order to obtain good adherence on Al—Mg alloys the substrate was pre-coated by well-known enamel composition. The layer thickness amounted to about 20-25 μm. In order to obtain a dish-washer and acid resistance the enamel slurry "a" was wet sprayed onto first layer as the second layer. The layer thickness amounted about 50-60 μm. After drying 2 coats, the composition was fired at the temperature of 560° C.
Enamel composition was tested according to:
Spalling test
The results may be found in table 12.

TABLE 12

| | Aluminium-magnesium alloys | |
|---|---|---|
| Alloy N | 3105 | 3004 |
| Spalling test | Ok | Ok |

Dish-washer resistance, "Pemco" home test—Calgonit® compact 6 h/60° C.-30 g Calgonit®/l:
weight loss −1.1 g/m$^2$
Acid resistance, EN14483-1, §9: class A Example 6

A third glass frit C was smelted according to conventional means (1150° C./20 min) whereby a glass frit resulted after melting with the composition and TEC shown in table 13.

TABLE 13

| $Al_2O_3$ | $B_2O_3$ | CaO | $Fe_2O_3$ | $K_2O$ | $Li_2O$ | $MoO_3$ | $Na_2O$ | $P_2O_5$ | $SiO_2$ | $TiO_2$ | TEC 400 |
|---|---|---|---|---|---|---|---|---|---|---|---|
| 0.5 | 2 | 2.5 | 4.3 | 11.8 | 2.3 | 0.3 | 19.1 | 2 | 37 | 18.2 | 159 * 10$^{-7}$ |

The frit was wet milled to a fineness of 0.1/16900# (BAYER®-Enamel-Test sieve) to enamel slurry. The composition of the slurry is shown in table 14.

TABLE 14

| Component | Parts by weight |
|---|---|
| Frit | 100 |
| Boric acid | 4 |
| Potassium hydroxide | 1.5 |
| Sodium silicate | 1 |
| Deionised water | 50 |

After grinding and sieving the enamel was sprayed on to substrate and fired at the temperature of 560° C. The layer thickness amounted about 65-80 μm.

Enamel was tested according to:
Spalling test
The results may be found in table 15.

TABLE 15

| | Substrate | | | | | | |
|---|---|---|---|---|---|---|---|
| | Aluminium alloys, aluminium-magnesium alloys | | | | Stainless steel | | Cast |
| | 4917 | 4006 | 3003 | 3105 | 3004 | 304 | 316L | Alu |
| Spalling test | Ok | Ok | Ok | Ok | Ok | Ok | Ok | Ok |

Dish-washer resistance, "Pemco" home test—Calgonit® compact 6 h/60° C.-30 g Calgonit®/l:
weight loss −1.8 g/m²
Acid resistance, EN14483-1, §9: class A+

Example 7

Said third glass frit C was smelted according to conventional means (1150° C./20 min) whereby a glass frit resulted after melting with the composition and TEC shown in table 13.

The frit was milled to a finesse D (50) 3-4 μm. 100 g of the powder was mixed with 40 g of the screen-printing medium to the past. The past was applied on the enameled surface (as example 6) using screen-printing technology. After drying the enamel layer was fired at the temperature of 560° C. The layer thickness amounted about 5-6 μm.

Enamel was tested according to:
Spalling test
The results may be found in table 16.

TABLE 16

| Substrate | Aluminium alloy 4006 |
|---|---|
| Spalling test | Ok |

Dish-washer resistance, "Pemco" home test—Calgonit® compact 6 h/60° C.-30 g Calgonit®/l:
weight loss −0.3 g/m²
Acid resistance, EN14483-1, §9: class AA Example 8

The said glass frits A, B and C were compared with seven known $V_2O_5$-free frit compositions. The composition of the references are according to DE 3516009 A1, FR-A-1251468, SU 1803394, DE 2422291 A1. The composition of reference 1 is according to DE 3516009 A1 example 4. References 2 to 4 are according to FR-A-1251468, compositions B, C, and D. The composition of reference frit 5 is according to SU 1803394, example 1. According to DE 2422291 A1, table II frits 3 and 4 are the compositions of the references 6 and 7.

The compositions of the different frits in weight-% can be seen in table 17.

TABLE 17

| Composition | Frit A | Frit B | Frit C | Ref 1 | Ref 2 | Ref 3 | Ref 4 | Ref 5 | Ref 6 | Ref 7 |
|---|---|---|---|---|---|---|---|---|---|---|
| $Al_2O_3$ | 0.5 | 0.1 | 0.5 | 1.5 | 3 | 3 | 7 | | | |
| $B_2O_3$ | 2 | 0.6 | 2 | 4 | | 4 | 2 | 3.3 | 2.54 | 2.51 |
| BaO | | 0.3 | | | | | | | | |
| SrO | | | | | | 3 | | | | |
| CaO | 2.5 | | 2.5 | 2.5 | | | 2 | | | |
| CuO | | | | | | | | 2.5 | 4.2 | |
| $Sb_2O_3$ | | | | | | 2 | 3 | | | |
| $SnO_2$ | | | | | 5 | 3 | | | | |
| $Fe_2O_3$ | 4.3 | 3 | 4.3 | 3 | 0 | 0 | 0 | | 5.79 | 5.72 |
| CoO | | | | | | | | | | |
| NiO | | | | | | | | | 4.3 | 5.59 |
| MnO | | | | | | | | | | |
| $K_2O$ | 11.8 | 11.8 | 11.8 | 13 | 8 | 8 | 12 | 0 | 12.4 | 12.2 |
| $Li_2O$ | 2.3 | 2.3 | 2.3 | 5 | 5 | 3 | 2.5 | 3.7 | 3.67 | 3.62 |
| $Na_2O$ | 19.1 | 19.2 | 19.1 | 15 | 28 | 20 | 20 | 27.8 | 17.6 | 17.4 |
| $F_2$ | | | | | | | | | | |
| $MoO_3$ | 0.3 | | 0.3 | | | | | | | |
| $P_2O_5$ | 2 | 1.6 | 2 | 2 | | | 2.5 | 2 | | |
| $SiO_2$ | 39.1 | 35.2 | 37 | 38 | 30 | 40 | 34 | 38 | 38.1 | 37.6 |
| $TiO_2$ | 16.1 | 23.7 | 18.2 | 16 | 21 | 11.5 | 13 | 22.5 | 15.6 | 15.4 |
| $V_2O_5$ | | 2.2 | | | | | | | | |
| $ZrO_2$ | | | | | | | | | | |
| ZnO | | | | | | | | | | |
| $Na_2SiF_6$ | | | | | | | | | 0.5 | |

The glass frits A, B, and C as well as the reference glass frits were milled to a fineness of 0.1/16900# (BAYER®-Enamel-Test sieve) to obtain enamel slurry. The composition of the slurry is shown in table 9. The slurries were sprayed onto substrate.

The enamels were tested according to:
Spalling test.
The results may be found in table 18.

TABLE 18

| Substrate | Frit A | Frit B | Frit C | Ref 1 | Ref 2 | Ref 3 | Ref 4 | Ref 5 | Ref 6 | Ref 7 |
|---|---|---|---|---|---|---|---|---|---|---|
| 4006** | Good | Good | Good | good | * | medium | medium | good | good | good |
| 4917** | Good | Good | Good | medium | * | medium-bad | bad | good | good | medium |

*Reference 2 is not applicable on pH values higher than 12
**Substrates 4006 and 4917 representing aluminium alloys Dish-washer resistance, "Pemco" home test—Calgonit® compact 6 h/60° C.-30 g Calgonit®/l. The results may be found in table 19.

TABLE 19

| | Frit A | Frit B | Frit C | Ref 1 | Ref 2 | Ref 3 | Ref 4 | Ref 5 | Ref 6 | Ref 7 |
|---|---|---|---|---|---|---|---|---|---|---|
| dishwasher test* | 2.4 | 0.8 | 1.8 | 2.5 | * | 2.1 | 1.9 | 1.2 | 1.7 | 1.8 |

*Reference 2 is not applicable on pH values higher than 12.

Acid resistance according to EN 14483-1, §9. The results may be found in table 20.

TABLE 20

| | Frit A | Frit B | Frit C | Ref 1 | Ref 2 | Ref 3 | Ref 4 | Ref 5 | Ref 6 | Ref 7 |
|---|---|---|---|---|---|---|---|---|---|---|
| acid resistance | A+ | AA | A+ | unclassified | unclassified | unclassified | unclassified | unclassified | A | A |
| $Li_2O + B_2O_3/TiO_2$ | 0.53 | 0.25 | 0.39 | 1.13 | 0.64 | 1.1 | 0.69 | 0.6 | 0.68 | 0.68 |

The enamels of this invention show a very good acid resistance, which can not be reached by the reference enamels, where the molar ratio of ($Li_2O+B_2O_3$) to $TiO_2$ is larger than the one of the present invention.

The acid resistance of the transparent enamels is better than that of the pigmented ones, as the additive of pigments often influences the chemical stability of the enamel.

The colour of the resulting enamels was compared, according to the "Lab" color space, "L" means lightness, and "a" and "b" are the color-opponent dimensions. An L-value of 100 means a very light enamel, while a value of 0 means an extremely dark one. Red and green colouring of the enamel are considered in the a-value, while yellow and blue are considered in the b-value.

The results may be found in table 21.

Transparency of the enamel, including low a- and b-values, is necessary for colouring with inorganic pigments and/or effect pigments.

The invention claimed is:
1. Transparent porcelain enamel compositions for enameling a substrate selected from the group of aluminium, cast aluminium, aluminium alloy, and aluminium-magnesium alloy, said composition including a glass frit, said glass frit based on 100 wt-% comprising each by weight:

about 30 wt-% to about 50 wt-% $SiO_2$,
about 30 wt-% to about 40 wt-% $R_{20}$,
about 15 wt-% to about 25 wt-% $TiO_2$,
about 0 wt-% to about 5 wt-% RO,
about 0 wt-% to about 4 wt-% $V_2O_5$,
about 0.3 wt-% to about 5 wt-% $Fe_2O_3$,
about 0 wt-% to about 5 wt-% $Sb_2O_3$
about 0 wt-% to about 3 wt-% $SnO_2$
about 0 wt-% to about 2 wt-% $B_2O_3$,
about 0 wt-% to about 3 wt-% $Al_2O_3$,
about 0 wt-% to about 4 wt-% $P_2O_5$,
about 0 wt-% to about 1 wt-% $MoO_3$,
about 0 wt-% to about 2 wt-% $F_2$,
about 0 wt-% to about 4 wt-% $ZrO_2$,
about 0 wt-% to about 4 wt-% ZnO and
about 0 wt-% to about 6 wt-% $N_2O_5$

TABLE 21

| | Frit A | Frit B | Frit C | Ref 1 | Ref 2 | Ref 3 | Ref 4 | Ref 5 | Ref 6 | Ref 7 |
|---|---|---|---|---|---|---|---|---|---|---|
| colour | transparent | transparent | transparent | creme-opaque | white | transparent | dark blue-green | dark blue-green | dark brown | dark brown |
| L | 69.5 | 67.5 | 70.9 | 72.3 | 72.2 | 59.7 | 49.2 | 54.1 | 47.3 | 41.7 |
| a | −1.8 | −0.5 | −1.6 | −1 | 1 | 0.58 | −7.9 | −13.2 | 11 | 8.1 |
| b | 18 | 14.7 | 15.6 | 10.1 | −1.8 | 8.18 | −11.6 | −17.5 | 25.6 | 16.2 | wherein
R$_2$O is a combination of alkaline oxides selected from the group of Na$_2$O, K$_2$O, and Li$_2$O, in molar fractions, based on the entirety of the glass composition, of:
Na$_2$O 10-23 mol %
K$_2$O 7-20 mol %
Li$_2$O 1-6.5 mol %,
wherein the molar ratio of (Li$_2$O+B$_2$O$_3$) to TiO$_2$ amounts to 0.2 to 0.6, and
RO is an earth alkaline oxide selected from the group of CaO, SrO, BaO, MgO and combinations thereof.

2. The composition according to claim 1 being void of V$_2$O$_5$.

3. The compositions according to claim 1 further comprising inorganic pigments and/or effect pigments.

4. The composition of claim 1 further comprising mill additions selected from the group consisting of boric acid, formic acid, molybdic acid, sodium molybdate, ammonium molybdate, potassium silicate, sodium silicate, lithium silicate, hydroxides, fluorides, carbonates, nitrate, nitrite, aerosols, urea, inorganic pigments, effect pigments and combinations thereof.

5. Substrate selected from the group of aluminium, cast aluminium, aluminium alloy, aluminium-magnesium alloy, copper, austenitic stainless steel and mild steel having an enameled surface made of an enamel frit according to claim 1.

6. A process of making a porcelain coated substrate, comprising:
a) applying a porcelain composition to a substrate of aluminium, cast aluminium, aluminium alloy, or aluminium-magnesium alloy, said composition comprising:
based on 100% by weight:
about 30 wt-% to about 50 wt-% SiO$_2$,
about 30 wt-% to about 40 wt-% R$_2$O,
about 15 wt-% to about 25 wt-% TiO$_2$,
about 0 wt-% to about 5 wt-% RO,
about 0 wt-% to about 4 wt-% V$_2$O$_5$,
about 0.3 wt-% to about 5 wt-% Fe$_2$O$_3$,
about 0 wt-% to about 5 wt-% Sb$_2$O,
about 0 wt-% to about 3 wt-% SnO$_2$
about 0 wt-% to about 2 wt-% B$_2$O$_3$,
about 0 wt-% to about 3 wt-% Al$_2$O$_3$,
about 0 wt-% to about 4 wt-% P$_2$O$_5$,
about 0 wt-% to about 1 wt-% MoO$_3$,
about 0 wt-% to about 2 wt-% F$_2$,
about 0 wt-% to about 4 wt-% ZrO$_2$,
about 0 wt-% to about 4 wt-% ZnO and
about 0 wt-% to about 6 wt-% N$_2$O$_5$
wherein
R$_2$O is a combination of alkaline oxides selected from the group of Na$_2$O, K$_2$O, and Li$_2$O, in molar fractions, based on the entirety of the glass composition, of:
Na$_2$O 10-23 mol %
K$_2$O 7-20 mol %
Li$_2$O 1-6.5 mol %,
wherein the molar ratio of (Li$_2$O+B$_2$O$_3$) to TiO$_2$ amounts to 0.2 to 0.6, and
RO is an earth alkaline oxide selected from the group of CaO, SrO, BaO, MgO and combinations thereof; and
b) firing said porcelain composition applied to said substrate at a temperature between 520-580° C.

* * * * *